Dec. 8, 1959  R. A. ROSTAN  2,916,540
FLOOR MOUNTED ELECTRICAL CONDUIT
Filed Oct. 8, 1954
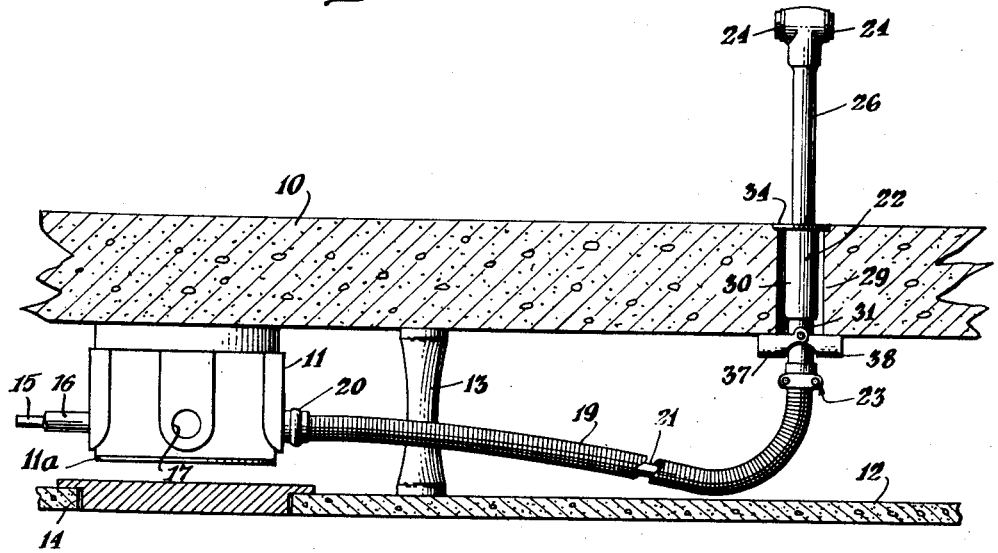
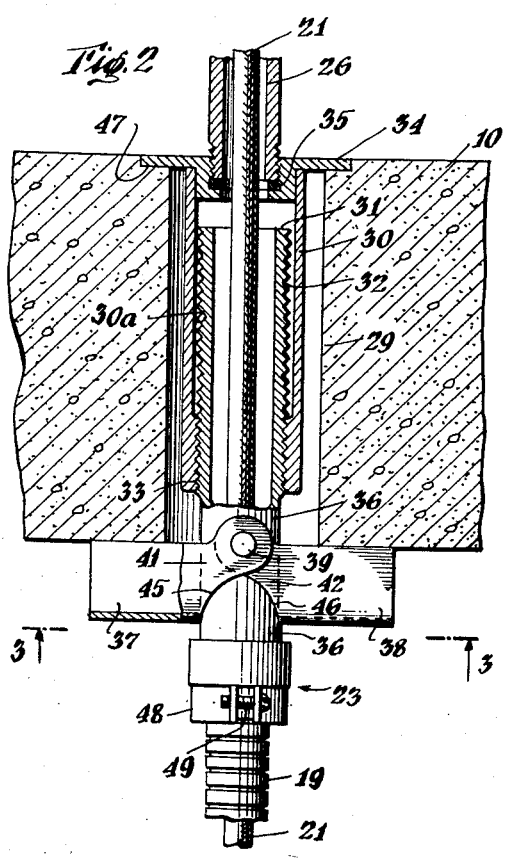
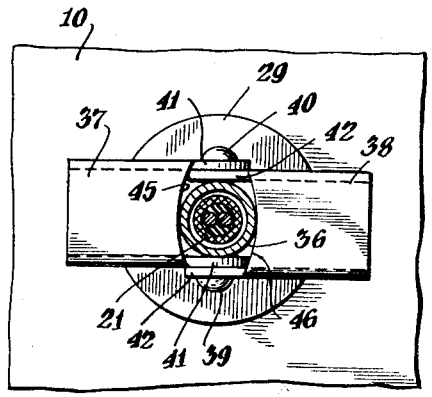
INVENTOR
*Robert A. Rostan*
BY
*Frank A. Bauer*
ATTORNEY

United States Patent Office 2,916,540
Patented Dec. 8, 1959

2,916,540

FLOOR MOUNTED ELECTRICAL CONDUIT

Robert A. Rostan, Bronx, N.Y., assignor to Russell & Stoll Company, Inc., New York, N.Y., a corporation of New York Application October 8, 1954, Serial No. 461,075

4 Claims. (Cl. 174—48)

This invention relates to electrical distribution systems and particularly to the distribution of electricity to floor receptacles. The invention is also directed to utility receptacles mounted on floors.

An object of this invention is to provide an electrical distribution system that may be extended after the construction of a building has been completed.

Another object of the invention is to provide an electrical distribution system with utility receptacles connected therewith located at any desired location on a floor.

Another object of the invention is to provide a system that is not expensive to install at the time of construction of the building and inexpensive to make additions thereto.

Another object of the invention is to provide means for mounting an outlet in a floor accessible only from one surface and that is easily clamped into position.

A further object of the invention is to provide a receptacle that may be installed from the top of the floor with the cable extending through from the bottom of the floor.

Further objects and advantages appear from the following description taken in connection with the accompanying drawings in which:

Fig. 1 is a plan view of the extension system and junction box;

Fig. 2 is a sectional view of the receptacle; and

Fig. 3 is a bottom view of the receptacle.

Heretofore utility receptacles of an electrical distribution system in a building have commonly been installed during the construction of the building in selected locations distributed over the floor surface. The distances between the receptacles were short so that at least one of the receptacles would not be too far from a lamp or machine requiring power. This type of installation is expensive, many receptacles being installed and never used. When a receptacle is used it may not be in a preferred position. Thus an extensive system is installed and maintained which does not fully satisfy the needs of the users.

In the present system utility receptacles are not placed in the floor until the need for their use arises. The receptacles are then installed in the most advantageous position for their immediate use. There is thus a saving of having unused receptacles located in the floor and an advantage of having a receptacle at a most desirable position when needed.

In commercial and industrial buildings, and particularly buildings of modern design, the floor 10 shown in Fig. 1 is made of reinforced concrete and has a substantial thickness in order to support concentrated as well as distributed loads on the floor surface. The ceiling 12 below the floor is usually of the false, or dropped, ceiling type and is spaced from the concrete floor to provide a utility space extending underneath the floor for housing air ducts, heating pipes, electric cable and the like. The ceiling 12 preferably comprises a light material, such as plaster or pre-fabricated board, supported or hung from the flooring 10 by posts 13 having one end embedded in the under-surface of the floor 10 and the other end secured by suitable means to the ceiling 12 to form a rigid ceiling structure. Thus the ceiling conceals the electrical wire and pipes and presents a uniform and pleasant appearing surface.

The space between the ceiling 12 and floor 10 is accessible from below the floor by strategically placed manholes 14 in the ceiling. The manholes may be closed by covers fitting in the ceiling flush with the exterior ceiling surface. The ceiling 12 conceals the lower surface of the floor 10 and renders the under-surface inaccessible except for the portions adjacent a manhole.

In the distribution of electricity to large floor areas of buildings terminal boxes 11 are suspended in the utility space from the under-surface of the floor. The terminal boxes are spaced a substantial distance apart and only a few are required to be installed for a particular floor. Preferably the boxes are uniformly spaced with a manhole conveniently located near the box to render it readily accessible for subsequent additions to the electrical distribution system. The terminal box is supplied with electrical power through permanently installed conduits 16 having main electrical cables or lines 15 connected to main feeding cables (not shown) passing through vertical ducts in the building.

The terminal box has openings 17 in the casing for connecting extensions to the terminal box. The terminal box may be of the conventional steel type fastened to the under-surface of the floor by bolts or other suitable means and having a readily removable cover 11a. The cover 11a is accessible from the manhole and connections can be made from the manhole by removing the cover 11a. The terminal box preferably has openings on all sides so that the entire floor area around the box may be easily connected with the box by an extension. The terminal box may be above the manhole adjacent to the manhole where connections may be easily made. The cable 15 connects the terminal box with the main power lines.

The extension preferably comprises a flexible sheath 19 and a cable 21 passing through the sheath. The sheath is secured at one end to the casing of the terminal box by a connector 20 and at the other end secured to the receptacle 22 by the clamp 23. The sheath is flexible so that it may be bent around the other pipes and cables in the utility space to permit the easy installation of the extension. The connector 20 may be of the plug and socket type, fastening the sheath to the casing and connecting the cable 21 to the cable 15 or the connector 20 may pass the cable through the opening 17 and connect the sheath 19 to the casing. The cable is connected inside the box to the cable 15 by a terminal strip or the like (not shown). At the outlet end the cable 21 passes through the outlet to connect to a utility receptacle mounted in a floor plate 34 or floor extension 26. Thus electricity is available from above the floor 10. The terminal box 11 and the conduit 16 with the cable 15 are installed at the time of the construction of the building. The extension and the outlet 22 may be added at any subsequent time by drilling a hole 29 through the floor 10 into which the outlet is inserted. The extension may then be passed through the manhole and the connections completed.

The outlet 22 comprises tubular members 30 and 31 threaded together to clamp to the floor 10 by engaging the upper and lower surfaces of the floor. In Fig. 2 the member 31 has a long threaded portion 32 on the outer surface engaging complementary threaded portion 33 on the inner surface of the member 30. The tubular members 30 and 31 overlap a substantial portion of their longitudinal lengths when the outlet 22 is clamped in position and have individual lengths which are nearly equal to the depth of a floor so that the members 30, 31 may be extended longitudinally to permit the ready insertion of the receptacle in the hole 29. The member 30 has a hollow cylindrical portion 30a with a plate 34 fastened to the end of the member. Plate 34 has a disc portion and an insert portion fitting inside of the cylindrical portions of the member 30 and secured to the inner surface. A threaded opening is provided in the plate into which a utility receptacle may be fastened or to which an extension 26 or a similar utility device may be threaded. The extension 26 seats against a gasket 35 to seal the receptacle from water or other fluids on the surface of the floor 10. The disc portion sets in a recess in the floor so that the receptacle is either flush or below the surface of the floor.

The member 31 has the threaded portion 32 and an unthreaded portion 36. Fingers 37, 38 are pivotally mounted on the pins 39, 40 fitting into opposite sides of the portion 36. The fingers have a U-shaped cross-section with hinges or arms 41 and 42 extending from the sides of the fingers 37, 38 with notches 45 and 46 formed in the sides and bottoms of the fingers 37, 38 so that the fingers fit around the outer surface of the tubular member 31. The fingers may be pivoted about the pins 39, 40 to nest around the tubular member 31. In nesting the fingers 37, 38 around the tubular member 31, the outlet 22 fits inside the hole 29 and may be dropped through the hole 29 from the upper surface of the floor 10. When the fingers are inserted all the way through the floor 10 and are free of the walls of the hole 29 they pivot about the pins 39, 40 into a position lateral to the member 31 and catch on the under-surface of the floor 10. The arc through which the fingers pivot is limited at the lateral position by the edge of the bottom of the fingers engaging the portion 36 of the tubular member 31. The outlet 22 is tightened or secured to the floor 10 by turning the tubular member 30 by means of the floor plate 34. The lower tubular member is held stationary by the sheath 19 attached to the member 31 by the cable clamp 23. The sheath resists the twisting torque applied by the threaded member 30. The tubular members 30, 31 are thus telescopically drawn together and overlap substantial portions of their longitudinal lengths. The disc portion of the floor plate 34 is recessed below the surface of the floor or even therewith and engages a shoulder 47 formed in the floor 10. Thus the outlet is firmly clamped between the upper or accessible surface of the floor and the lower or inaccessible surface. The member 31 has a threaded portion 32 and a smooth portion 36 with the clamp 23 at the opposite end of the portion 36 from the threaded portion 32. The portion 36 extends below the fingers 37, 38 and has the clamp 23 securely fastened thereto. The sheath 19 is secured to the clamp by the adjustable jaw 48 gripping the sheath against the clamp by the bolts 49. The fingers 37, 38 are pivotally mounted on the portion 36 between the threaded portion and the clamp. The threaded portions 32 and 33 form a locking or holding means for retaining the outlet clamped to the floor 10 and permit the separation of the members by the removal of the outlet from the floor.

The cable 21 passes through the telescoped members 30, 31 and a floor extension 26 and is electrically connected to the receptacles 24 on each side of the floor extension. The receptacle may be mounted in the plate 34 so that it is flush or below the surface of the floor.

The extension and the outlet 22 may be installed in several different manners. One of the methods of installing an extension is to drill the hole 29 at the desired location. The free end of the sheath 19 is dropped through the hole 29 and the other end is clamped to the receptacle 22 by the clamp 23 and is drawn to the manhole by means of a pulling cable. The outlet 22 is dropped through the hole 29 with the ends of the tubular members 30, 31 threaded together. The fingers 37, 38 are folded around the member 31. When the fingers are clear of the walls of the opening 29 they drop into the lateral position. The plate member 34 is turned, telescopically drawing the two members 30, 31 together until the disc portion and the fingers 37, 38 are tightly secured against the upper accessible and lower inaccessible surfaces of the floor 10. A cable puller then may be run through the sheath 19 and the outlet 22 from the manhole, and the cable 21 is connected to the puller and drawn through outlet 22 and the sheath 19. The end of the cable may then be secured to the terminal box 11 in any conventional manner, preferably the cable 21 will be connected to a terminal strip not shown. The other end of the cable at the outlet 22 is severed and the conductor secured to the receptacle 24 in the extension 26. The sheath 19 is secured to the casing of the terminal box 11 by the connector 20.

As previously described, the terminal boxes 11 may be located at various places throughout the floor and may remain for some time without any extensions connected thereto, or from time to time extensions may be added or removed for the convenience of the tenants or owners.

It is thus seen that an extensive utility receptacle system need not be installed when a building is originally constructed but may be added from time to time.

This system would also be applicable to old construction whereby terminal boxes 11 may be located underneath the floor and extensions made therefrom without the requirement of special conduits and connectors being installed in the old floors.

Various other advantages are obvious from the foregoing description and any changes and modifications may be made in the system without departing from the invention as set forth in the appended claims.

I claim:

1. An electrical outlet for passing a cable through a structural slab having an accessible surface and an inaccessible surface on opposite sides thereof, comprising a first member with an inner unobstructed passage for passing a cable therethrough and having a first coupling means on the outer surface on one end thereof, pivot means mounted on the outer surface at the outer end of said first member leaving said passage unobstructed, fingers pivotally mounted on said pivot means with said fingers extending longitudinally of and on opposite sides of said first member, said fingers having means engaging said first member for supporting said fingers in a position at right angles to the longitudinal axis of said first member, a second member with an inner unobstructed passage and having a flange on one end thereof for engaging the accessible surface and an inner coupling means to lock with the first coupling means when said first and second members are in telescopic relation to clamp the outlet in a structural slab, and said flange having a threaded opening for receiving a utility device.

2. An electrical outlet as called for in claim 1 wherein each finger is provided with a stop for engaging said first member for holding said fingers in a lateral position relative to said first member.

3. An electrical outlet as set forth in claim 1 wherein said first coupling means is provided with a threaded portion and said fingers each have a generally U-shaped formed by two side pieces and a bottom piece, said fingers each having hinges extending from said side pieces around opposite sides of said first member and pivotally connected to the unthreaded portion of said first member on opposite sides thereof, so that in a longitudinal position said U-shaped fingers fit around the tubular member and in a lateral position said bottom pieces engage said first member to hold said fingers in their lateral position.

4. An electrical outlet for passing a cable through a structural slab having an accessible surface and an inaccessible surface on opposite sides thereof, comprising a first member with an inner unobstructed passage for passing a cable therethrough and having opposite end portions, a first coupling means on said first member along one of said end portions, pivot means mounted on the outer surface at the other end portion of said first member and leaving said passage unobstructed, fingers pivotally mounted on said pivot means, said pivot means supporting said fingers to extend longitudinally on opposite sides of said first member in a collapsed position for insertion of said first member through an opening of said structural slab and supporting said fingers to extend laterally of said first member in a retaining position after passing through an opening in said slab, a second member with an inner unobstructed passage and having a flange at one end to engage the accessible surface of said slab and overlapping with said first member in telescopic relation, said flange having an opening and means for securing a utility device therein, said second member having coupling means interlocking with said first coupling means for clamping said fingers against the inaccessible surface and said flange against the accessible surface for firmly securing the outlet in a structural slab.

References Cited in the file of this patent

UNITED STATES PATENTS

| | | |
|---|---|---|
| 1,326,959 | Paine et al. | Jan. 6, 1920 |
| 1,396,278 | Paine et al. | Nov. 8, 1921 |
| 1,498,868 | Charm | June 24, 1924 |
| 1,515,324 | Arnold | Nov. 11, 1924 |
| 1,901,232 | Glowacki | Mar. 14, 1933 |
| 1,931,574 | Danielson | Oct. 24, 1933 |
| 1,982,464 | Buchanan | Nov. 27, 1934 |
| 2,297,139 | Flachbarth | Sept. 29, 1942 |
| 2,536,053 | Grashow | Jan. 2, 1951 |
| 2,616,327 | Karitzky | Nov. 4, 1952 |
| 2,738,892 | Wiesmann | Mar. 20, 1956 |

FOREIGN PATENTS

| | | |
|---|---|---|
| 498,208 | Canada | Dec. 8, 1953 |

OTHER REFERENCES

Pamphlet—Electric Wiring, Sears, Roebuck and Co., copyright 1953, pages 14–15. (Copy in Div. 69.)